(12) United States Patent
Boehme et al.

(10) Patent No.: US 7,353,452 B2
(45) Date of Patent: Apr. 1, 2008

(54) SYSTEM AND METHOD FOR HIERARCHICAL LAYOUT SPECIALIZATION

(75) Inventors: Thomas Friedhelm Boehme, Stuttgart (DE); Alexandra Liberman, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 10/502,247

(22) PCT Filed: Feb. 21, 2003

(86) PCT No.: PCT/EP03/01774

§ 371 (c)(1),
(2), (4) Date: Jul. 22, 2004

(87) PCT Pub. No.: WO03/083704

PCT Pub. Date: Oct. 9, 2003

(65) Prior Publication Data
US 2005/0120288 A1 Jun. 2, 2005

(30) Foreign Application Priority Data
Mar. 28, 2002 (EP) .................................. 02007137

(51) Int. Cl.
*G06F 17/00* (2006.01)

(52) U.S. Cl. ...................... 715/517; 715/526; 715/530; 715/500

(58) Field of Classification Search ................ 715/511, 715/501.1, 517, 526, 530, 500
See application file for complete search history.

(56) References Cited

U.S. PATENT DOCUMENTS

| | | | |
|---|---|---|---|
| 6,023,715 A | 2/2000 | Burkes et al. | |
| 6,327,628 B1 * | 12/2001 | Anuff et al. | 719/311 |
| 6,760,840 B1 * | 7/2004 | Shimbo et al. | 713/165 |
| 6,839,878 B1 * | 1/2005 | Icken et al. | 715/501.1 |
| 2003/0145275 A1 * | 7/2003 | Qian et al. | 715/500 |

FOREIGN PATENT DOCUMENTS

WO  WO0075840  12/2000

\* cited by examiner

*Primary Examiner*—Stephen Hong
*Assistant Examiner*—Matthew Ludwig
(74) *Attorney, Agent, or Firm*—Matthew Talpis; Streets & Steele; Jeffrey L. Streets

(57) ABSTRACT

The present invention discloses a system and method for delegated page specialization based on a page layer concept. A page consist of a set of layers. Except the first layer each layer represents a delta (container, frames) in its layout to its previous layer introduced on the corresponding level of administration. Administrators can modify the previous layers by defining new immutable and optional containers or frames on the page (delta). Only the deltas to the previous layers are stored with assignments to their parent layers. Immutable containers or frames of previous layers cannot be modified. The final page is automatically constructed as an union of deltas being stored in a so called tree-structure. The delegated page specialization is preferably accomplished via a GUI-component which supports the administrators.

18 Claims, 9 Drawing Sheets

SYSTEM AND METHOD FOR HIERARCHICAL LAYOUT SPECIALIZATION

BACKGROUND

The present invention relates to pages in general and more specifically to documents of text processing systems, Portal Pages, Web pages, or any other type of pages having a certain layout that may be specialized by others, and in particular a system and method which provides the ability to create, retrieve, specify, and manipulate that layout in a hierarchical manner.

Without restricting the scope of the present invention to Portal Pages only, the present invention will be discussed with respect to Portal Pages as a preferred embodiment of the present invention.

BACKGROUND OF THE RELATED ART

Portals are becoming the focal points for users to access information (content) and applications from many different sources. Typically, Portals get information from local or remote data sources, e.g. from databases, transaction systems, syndicated Content-Providers, or remote Web Sites, and render and aggregate this information into complex pages to provide information to users in a condensed form. In addition to pure information, many Portals also include applications like e-mail, calendar, organizers, banking, bill presentment, etc. A well-known example is the Yahoo! Portal that provides access to a large amount of content and applications.

Different rendering and selection mechanisms are required for different kinds of information or applications, but all of them rely on the portal's infrastructure and operate on data or resources that are owned by the portal, e.g. user profile information, persistent storage or access to managed content. Consequently, most of today's Portal implementations provide a component model, where pluggable portal components modules referred to as Portlets can be added to the portal infrastructure. Portlets are pluggable components that can be added to Portals and are designed to run inside a portal's portlet container which provides a common interface to all executable portlets. Portlets may provide different functions ranging from simple rendering of static or dynamic content to application functions such as e-mail, calendar, etc. Portlets are invoked indirectly via the portal application and produce content that is suited for aggregation in larger Web pages, e.g. portlets should produce mark-up fragments adhering guidelines that assure that the content generated by different portlets can be aggregated into one Web page.

Each Portal Page has a specific layout. Layout means that each Portal Page may be divided in one or more areas (rows, columns) Those areas are called containers. Each container may be subdivided into one or more sub-containers or may include one or more frames which display a defined type of content rendered by portlets. The sub-container may be further divided into another sub-container and so on.

More and more global companies want to set up an Intranet Web Site for its employees. Each employee should have access to a variety of sources, including global, regional, and country-specific-content. Ideally each level of sources, e.g. global, regional, or country-specific, should have its own administrator for managing the area specific content accessible by the employees without allowing the administrator to delete content of the next higher level of source totally.

The prior art provides two approaches to that problem:

The top-level administrator of the Portal Page knows in advance which area specific content should be made available to whom. The administrator then places all content on the Portal Page, and uses a filtering technique to tailor the Portal Page to an individual employee at runtime. This is in essence the approach described by WO 0075840 A2 "Method for deducing level of interest in information structures via annotations". A disadvantage of that approach is that a centralized administration is required in order to determine the content to be provided to the employee. The central administration needs steady input from the regional and country organizations units regarding which content should be made available to the employees. This is time consuming and costly.

Another approach is that the content is split and distributed across several Portal Pages. Each level of administrators, e.g. responsible for global, regional, or country-specific content, constructs its own Portal Page that contains links to the other Portal Pages. A disadvantage of that approach is that the content structure needs to be navigated. Furthermore, there is no "view at a glance".

SUMMARY OF THE INVENTION

The present invention provides a new system and method for providing layout specialization of pages considering hierarchical administration and content requirements, yet avoiding disadvantages of the prior art approaches.

The present invention discloses a system and method for delegated page specialization based on a page layer concept. A page consists of a set of layers. Except the first layer, each layer represents a delta (container, frames) in its layout to its previous layer introduced on the corresponding level of administration. Administrators can modify the previous layers by defining new immutable and optional containers or frames on the page (deltas). Only the deltas to the previous layers are stored with assignments to their parent layers. Immutable containers or frames of previous layers cannot be modified. The final page is automatically constructed as a union of deltas being stored in a so called tree-structure. The delegated page specialization is preferably accomplished via a GUI-component which supports the administrators.

BRIEF DESCRIPTION OF THE DRAWINGS

The present invention will be described in more detail with the accompanying drawings in which.

DETAILED DESCRIPTION

A typical Portal Page consists of several frames 1-6. Each frame represents a place holder for content provided by a defined portlet. Containers 8 (dotted line) as defined in that application have no assigned portlets. They offer the possibility to create further sub-containers or to include frames.

Figure 2:
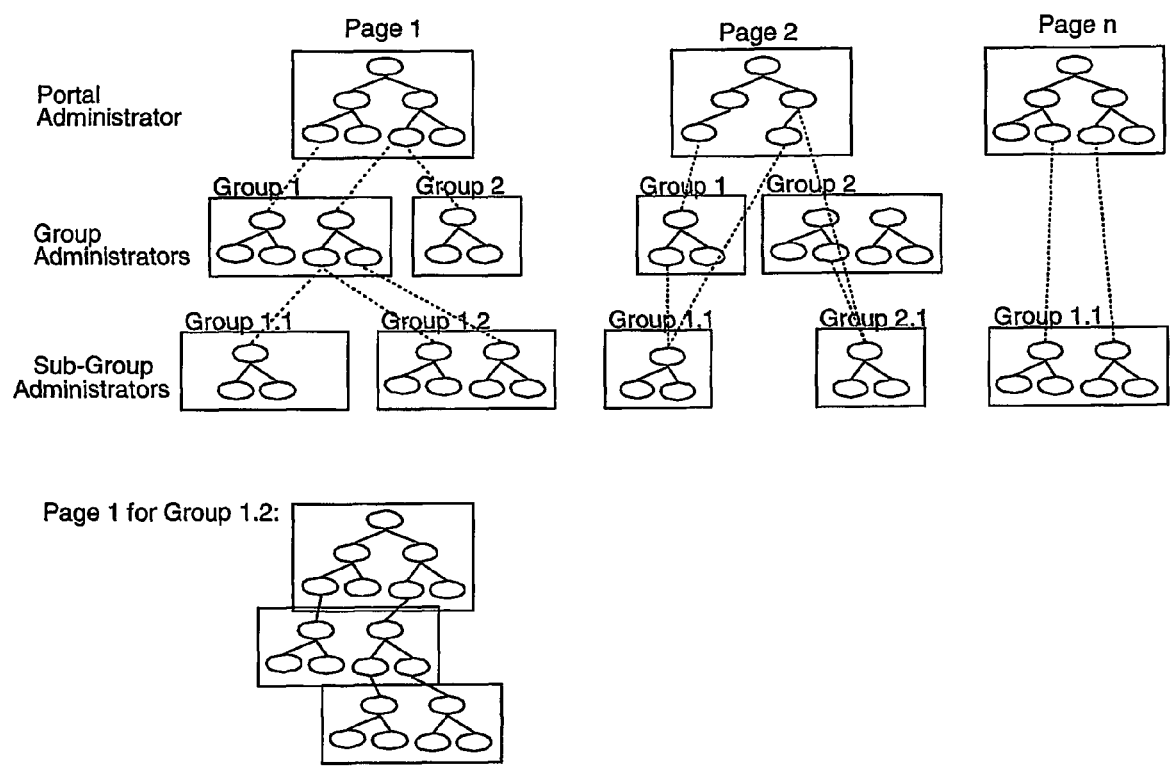
FIG. 2 shows the basic method of the present invention.

A very important aspect of the present invention is that the functionality to create, modify, delete or move containers or frames is distributed across several administration levels as shown in FIG. 2. The administrator of the highest level (Portal Administrator) creates a layer which may comprise one or more containers or frames and grants edit rights to a group of administrators of the next administration level. This may be done for each page (P1, P2, . . . Pn). The next administration level (Group Administrator/Sub-Group Administrator) can specialize that page by adding or removing containers/frames which have not been fixed by the Portal Administrator.

Figure 3:
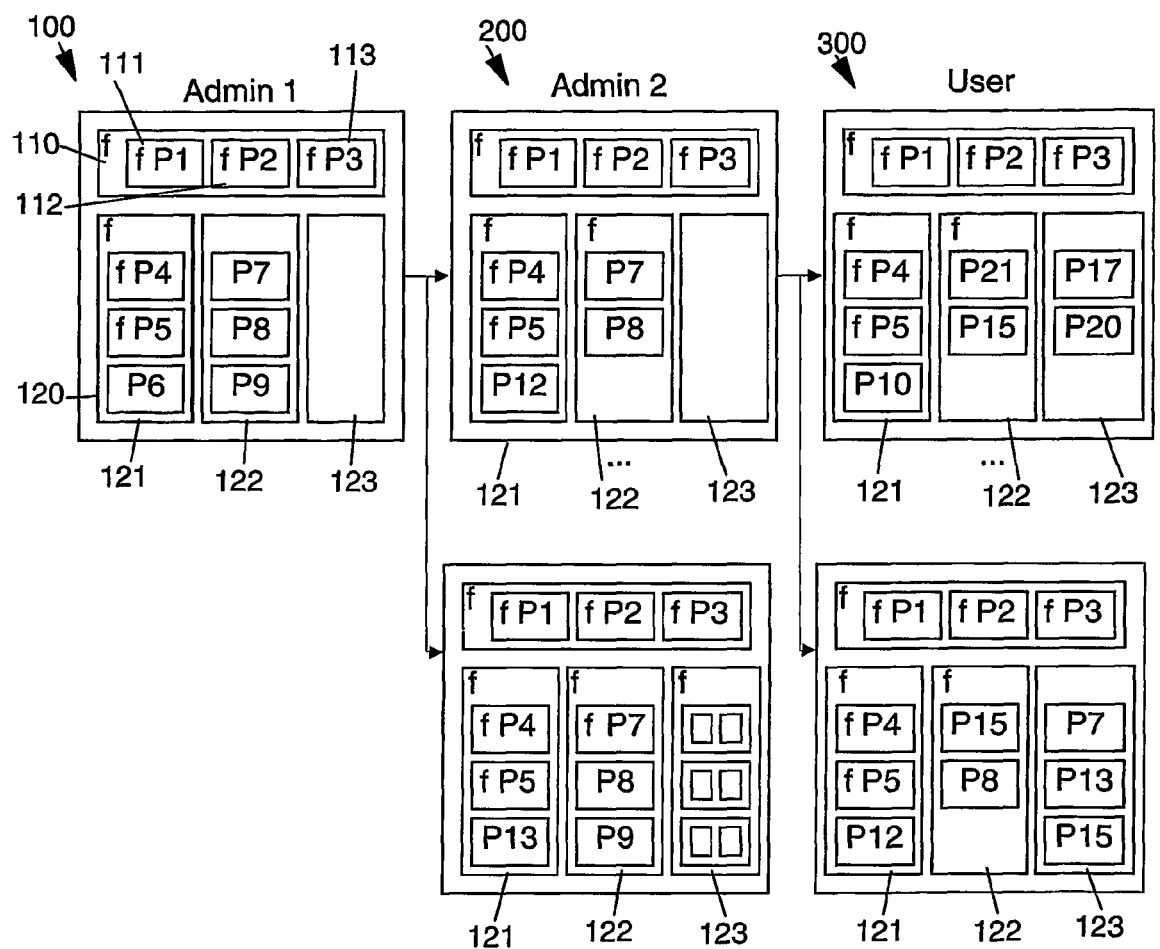
FIG. 3 shows the inventive page layer concept, FIG. 4A/B shows a preferred embodiment of the internal representation of the components (container) based on a three-layer structure.

FIG. 3 shows the inventive page layer concept.

For the implementation of the delegated page specialization a new page concept was introduced. A page consist of a set of layers 100,200,300. Except the first layer (basic layer, 100) each layer represents a delta (container, frames—derived layer) to its previous layer introduced on the corresponding level of administration. Administrators can modify the previous layer by defining new immutable and optional containers or frames on the page (delegated specialization). Only the deltas to the previous layer are stored with assignments (e.g. identifier) to their parent layer. Immutable containers or frames of previous layers cannot be modified. The final page is automatically constructed as union of deltas being stored in a so called tree-structure. So, derived layers can be represented as a tree structure with a basic layer created by a highest administration level in the root, and administration/user defined page fragments as leafs. FIG. 3 illustrates the delegated page specialization principle with 3 specialization layers 100, 200, 300. The Administrator on the highest level creates a basic layer 100 with 2 rows 110,120. The first row 110 is immutable(F) and includes 3 immutable frames 111-113 with portlets P1, P2 and P3. The second row is partly immutable and consists of 3 columns 121,122,123. The first column 121 is immutable and includes 3 frames: 2 frames with portlets P4 and P5 are immutable; the frame with portlet P6 is optional. The second 122 column and the third column 123 are optional. The second column 122 consists of 3 optional frames with portlets P7, P8 and P9. The third column 123 (container) is empty. This means that the following changes are permitted/prohibited on the next layers 200,300. The first row 110 cannot be changed at all because everything is immutable. In the second column 121 nothing can be added/deleted (the column is immutable), i.e. the number of columns cannot be changed. In the first column 121 only the last portlet (P6) can be replaced by another portlet. Nothing can be deleted. In the second column 122 and in the third column 123 all frames can be deleted, any containers/frame can be added. On the second level 200 one of the administrators has replaced the portlet P6 with the portlet P12 in the first column 120, removes the portlet P9 (with frame) from the second column 122 and makes this column immutable (f). Administrator/user on the next level 300 has replaced portlet P12 by portlet 10 in the first column 121, replaced portlets P7, P8 by P21,P15 in the second column 122 and added P17 and P20 to the third column. Nothing can be added/deleted from the second column 122.

Figures 4A, 4B:
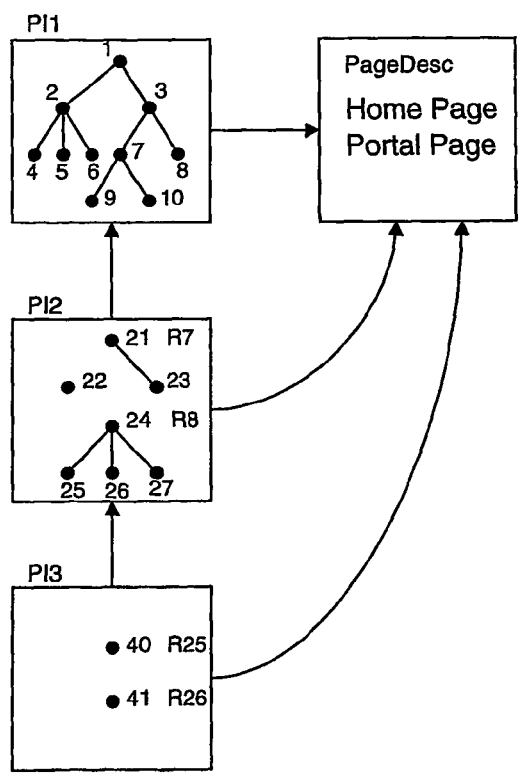

For the internal representation an overall page is constructed as a union of data store page layers. For this purpose the page instances for all layers previous to the layer, managed by the user whose pages are displayed, are loaded. Then all containers or frames belonging to these layers are loaded into the page and connected according to their parent/replacement relationships. The pointer to the tree root is set. This structure is flexible, allows fast tree traversing operation and provides enough information to save the structure back to several page instance elements. FIG. 4A, B illustrates an example of how a three-layer page instance structure (PI1, PI2, PI3) can be translated into an internal page representation. Each component (container or frame) either has a parent ID or a replacement ID. Furthermore each component has an assigned layer ID (not shown). The ordinal gives information about a position of a component in the children list of the parent component. The component with neither parent nor replacement is defined as a root component (FIG. 4B).

Figure 5A:
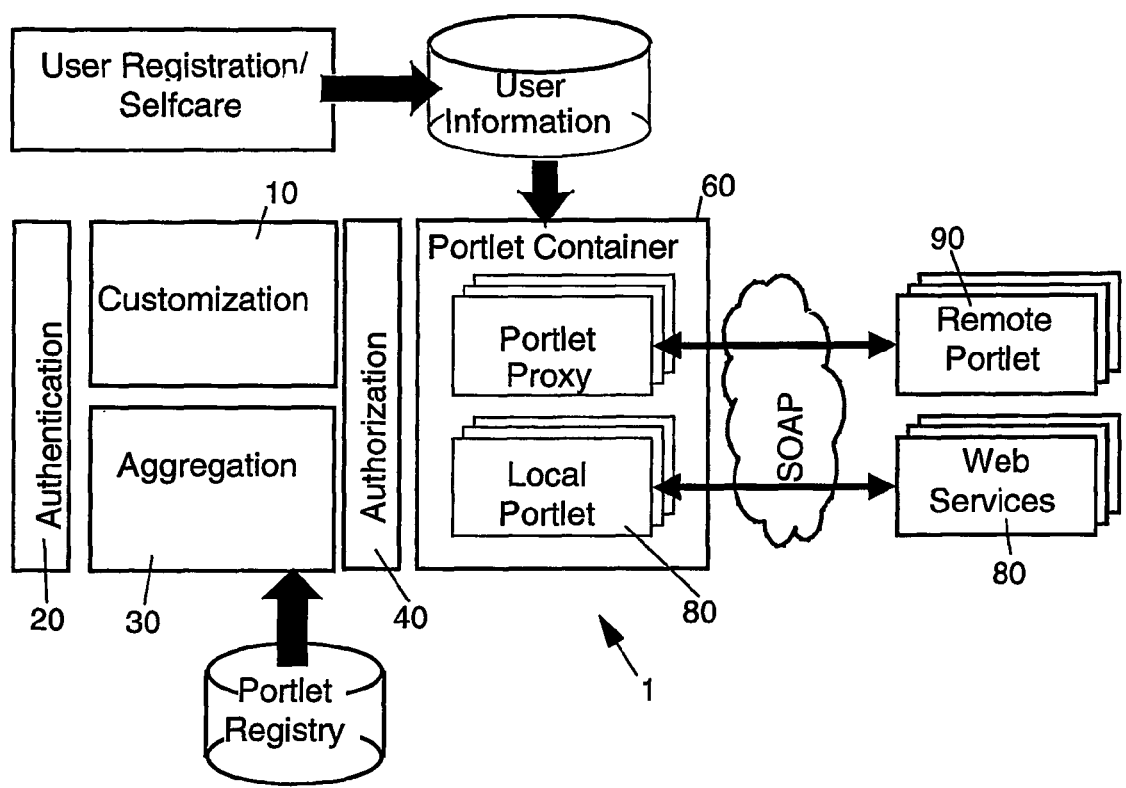
FIG. 5A shows a prior art portal.
Figure 5B:
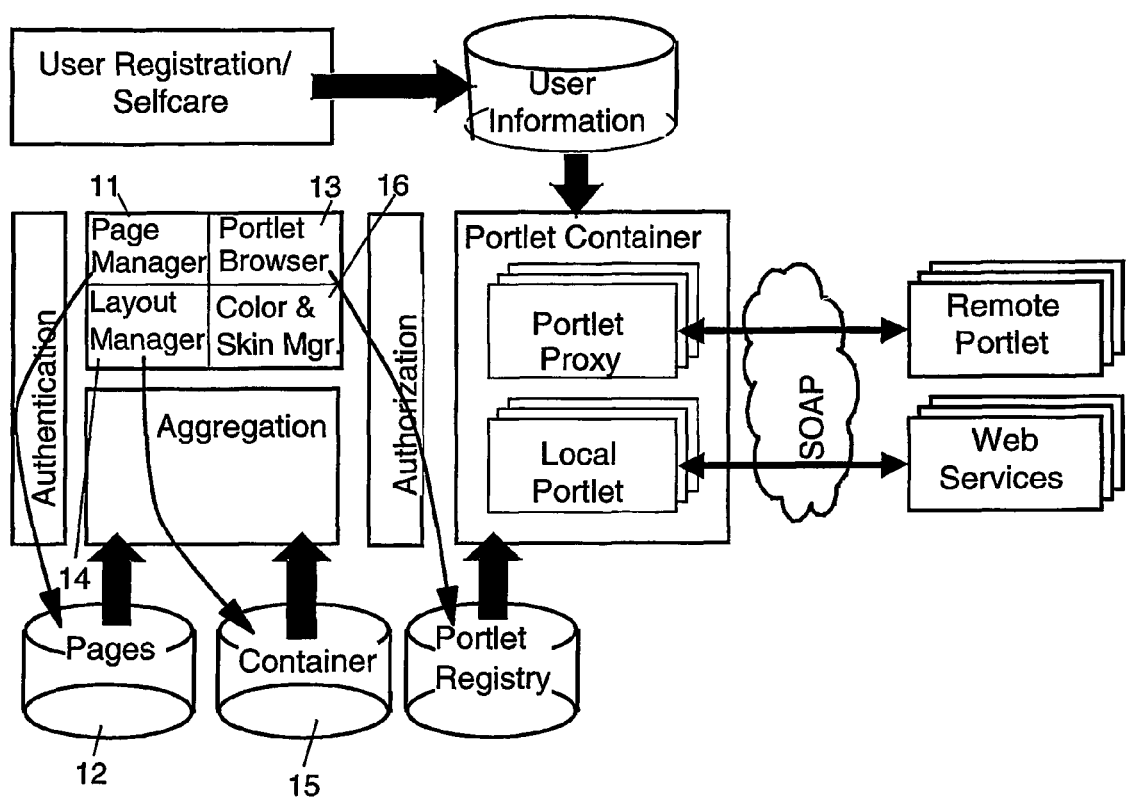
FIG. 5B shows that portal with the inventive modules.
Figure 7:
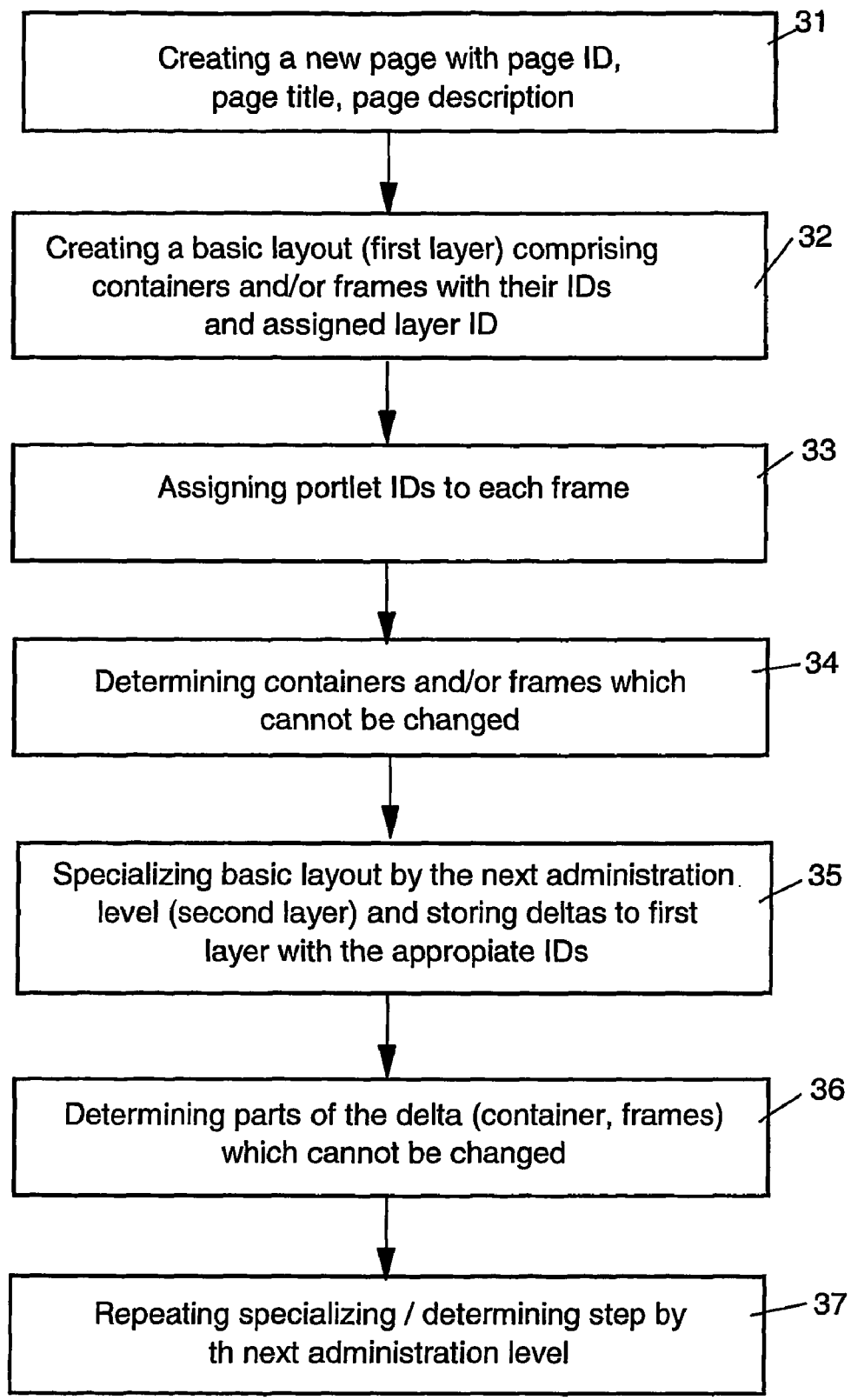
FIG. 7 shows a flow chart for the delegated page specialization by the different administration level as used by the present invention.

For example the first page instance PI1 (basic layout—first layer) defines 1-10 components, the second page instance PI2 (second layer) defines further components 21 to 27, and finally the third page instance PI3 (third layer) defines further components 40 and 41 (FIG. 4A). The internal representation scheme shows the parent/replacement relationship of the components (FIG. 4B). For example the components with the IDs 40 and 41 replace the components with IDs 25 and 26. The parent component for component 40 is now component 24, and for component 41 is now 24 too. The component 24 itself replaces component 8. The parent component of component 24 is now component 3. The parent component of component 3 is component 1 which has no further parent or replacement components. FIG. 7 shows the inventive method for delegated specialization. The administrator of the highest administration level creates a new page with an ID, page title, description 31. Then he defines a certain basic layout for that page which may comprise one or more containers with or without frames with their own ID and assigned layer ID 32. Portlets are assigned (Portlet ID) to each defined frame 33. Then, the administrator defines which one of the defined containers or frames cannot be changed by the next administration level and grants access rights to the next administration level to specialize that page 34. The next administration level may specialize the page by replacing frames, adding new frames into the existing container or deleting existing frames/container or moving frames from one container into another one or creating sub-containers provided it is allowed and the administrator has the access rights 35. Each specialization (layer, container, frame) is identified by their own ID (layer ID), and their associated parent ID. Finally the administrator may define parts of his performed specialization which cannot be changed and grants access rights to next administration level 36. The foregoing steps are repeated until the specialization is finished 37. A typical prior art Portal (FIG. 5A) preferably comprises an authentication component 20 for giving access to the portal 1, a customization component 10 allowing configuration of the portal 1, an aggregation component 30 which finds out which portlet in which order should be displayed on the requested user page, an authorization component 40 for providing access only to those portlets 80, 90 for which the user is registered, and a portlet container component 60 which provides a common interface to all executable portlets stored locally 80 or remotely 90. The new and inventive part of the present invention mainly addresses the customization component (FIG. 5B). The new customization component 11, 13, 14, 16 will be internally divided into several components for working with different parts of the layout design. The Page Manager 11 will be responsible for working with pages. The following actions will be a part of the Page Manager: create, rename, delete pages, set allowed mark up per page, change order, and manage access rights to pages. The pages created by the Page Manager 11 are stored in a page data store 12. The pages will include page title, description, etc. Several page instances (e.g., all the layers of the same page) will reference the same page descriptor. This will allow defining a title once and using it for all specialized pages. A page instance (layer) will correspond to one specialization layer and will reference only deltas (container or frames) defined on this layer. Each container or frame belongs to exactly one page and references either its parent or replacement container or frame. A replacement container/frame is a container/frame in the parent layer, which was replaced during specialization by this container/frame.

The Portlet Browser 13 will display and navigate portlets. The following actions are included: navigate available portlets, and search portlets.

The Layout Manager 14 will support constructing page layouts of containers or frames and working with fixed/optional elements. This includes add/remove columns and rows, add portlets, mark as "immutable"/"editable", edit portlets, edit column/row properties.

The data generated by the Layout Manager is stored in a container data store 15 as shown in FIG. 5B. The container data store 15 preferably stores the basic layout created by the highest administrator level in the first layer, and all deltas of each layer to its previous layer with their own ID as well as their parent layer ID.

The Colors & Skins Manager 16 will provide support for dynamic definition of component visual representation: apply skin to page or individual portlets, and select coloring scheme for page.

Figure 1:
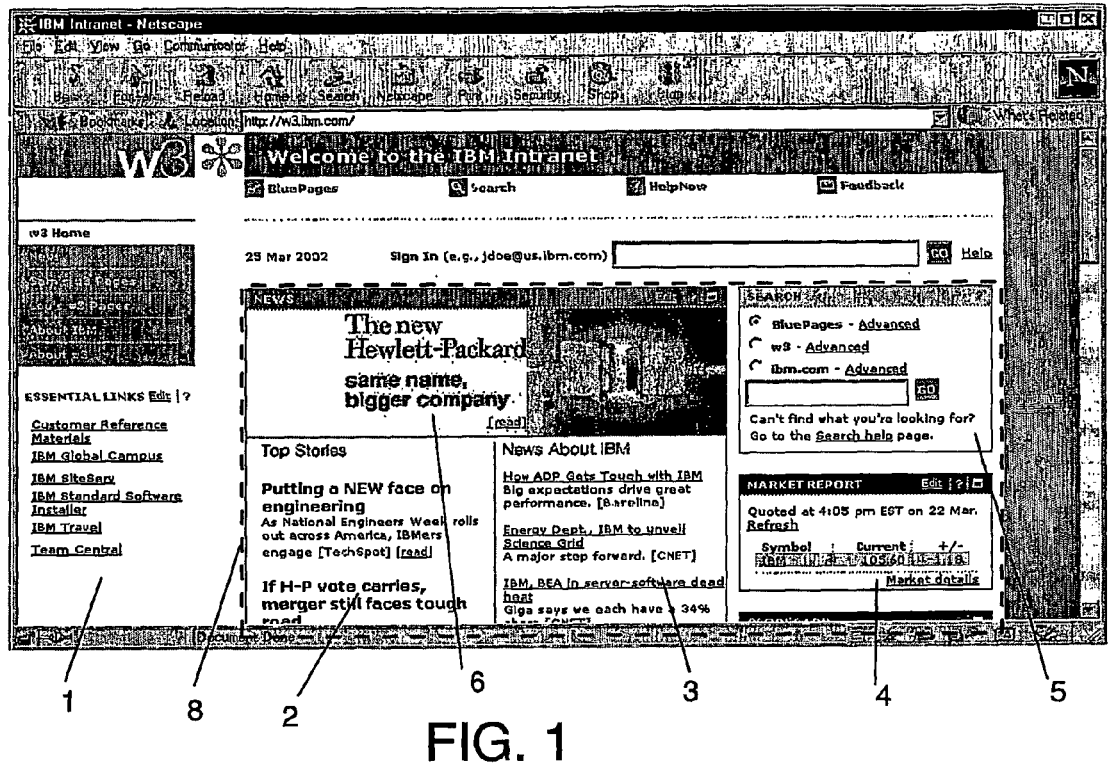
FIG. 1 shows a typical Portal Page with several frames.
Figure 6:
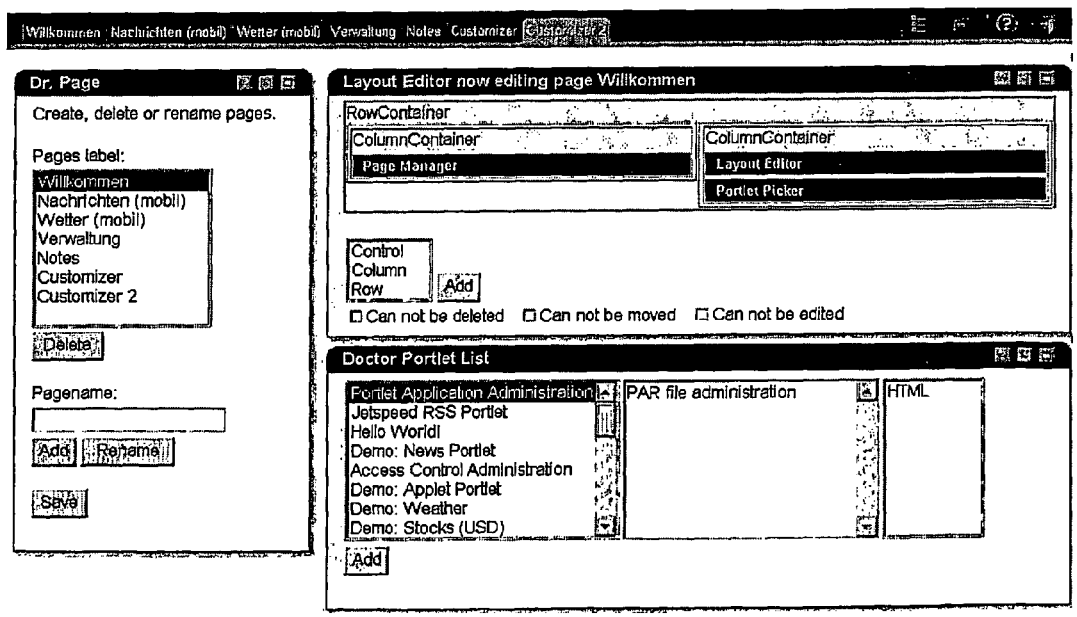
FIG. 6 shows a preferred embodiment of a GUI for administrators.

FIG. 6 illustrates an example GUI of the functionality of the Page Manager, the Portlet Browser and the Layout Manager as it could be provided for the portal administrator. The following GUI elements are provided in the Page Manager: a list element to show the available page, buttons to create/rename/delete page, text Entry field for new pages or renaming them. The Page Manager preferably implements the story "User creates page". Upon entering a new name, the user can select to create a new page by saving it. The new name does not have to be unique, but the for purpose of continued maintainability it is recommended to do so. A new page is initially empty. The user who created the new page has implicitly assigned "manage" rights to that page. Another story may be "user renames a page". The user selects an existing page, types the new name and chooses to rename that page. To rename a page, the user must have "manage" rights to that page. A further story may be "user deletes page". The user selects an existing page, and chooses to delete that page. To delete a page, the user must have "manage" rights to that page. User selects markups (devices). The user selects an existing page, selects the markups (or devices) that the page can be rendered for. Another functionality could be provided by a Page Chooser GUI which provides a list to show the available pages. The Page Chooser GUI may provide the story "user selects page for customization". The user selects an existing page, and chooses to view/edit that page. The layout manager shows the new page and prepares it for any allowed modification. The user is only presented with the pages that he or she has "view" or "manage" rights for. Upon entering the customizer (i.e. the page that contains all or part of the components described in this document), the page chooser has the current page pre-selected. A further functionality may be provided by a Portlet Browser GUI which provides a list of elements to show the available portlets and a button to add portlets. The Portlet Browser may provide the story "user adds portlet to layout". The user selects a portlet from the list of available portlets, and chooses to add to the current layout (see below) at a selected position. The portlet can only be added if its new parent is not marked as "immutable" or if parent belongs to a layer that the user has "manage" rights for. If the component that the portlet is added to is marked as "immutable" the portlet defaults to being not "editable". A further functionality may be provided by a Layout Manager GUI which provides the "layout area", a list element to show the available layout components at the moment: rows and columns), buttons to add, move, and remove layout components, and a button to save the (modified) page. The layout manager implements the story "User adds layout component". The user selects a layout component from the list of available components, and chooses to add it to the page. The component can only be added if its new parent is not marked as "immutable" or if the parent belongs to a layer that the user has "manage" rights for. Another story may be "User removes layout component". The user selects a layout component in the current layout, and chooses to remove it from the page. The selected component can only be added if its new parent is not marked as "immutable" or if parent belongs to a layer that the user has "manage" rights for. A further story may be "User moves layout component" The user selects a layout component in the current layout, and chooses to move it. The selected component can only be added if its new parent is not marked as "immutable" or if the parent belongs to a layer that the user has "manage" rights for. A further story is "marks layout component as "immutable". The user selects a layout component in the current layout, and marks it as "immutable". As a side effect, all parent components will implicitly marked as "immutable" as well. The user can only change the current setting if s/he has "manage" rights for the layer that the respective component is part of. Another story may be "user marks portlet as "editable". The user selects a portlet in the current layout, and marks it as "editable". This means that the users who have an "edit" right for the page and the "edit" right for the portlet will be able to edit the portlet. The portlet that are declared as "not editable" can be only edited by the administrator who has "manage" right for the layer that the portlet is part of. The user can only change the current setting if she/he has "manage" rights for the layer that the respective portlet is part of. A further story may be "user edits portlet". The user selects a portlet, and chooses to edit that portlet. The user can only edit a portlet if she/he has either "manage" rights for the layer that portlet is part of or if she/he has "edit" rights and that portlet is marked as "editable". Finally, a further story may be "User saves page". The user chooses to save the current page and its layout. If this is not the initial layer, it adds another layer to the existing one(s) that this page is based on.

Figure 8A:
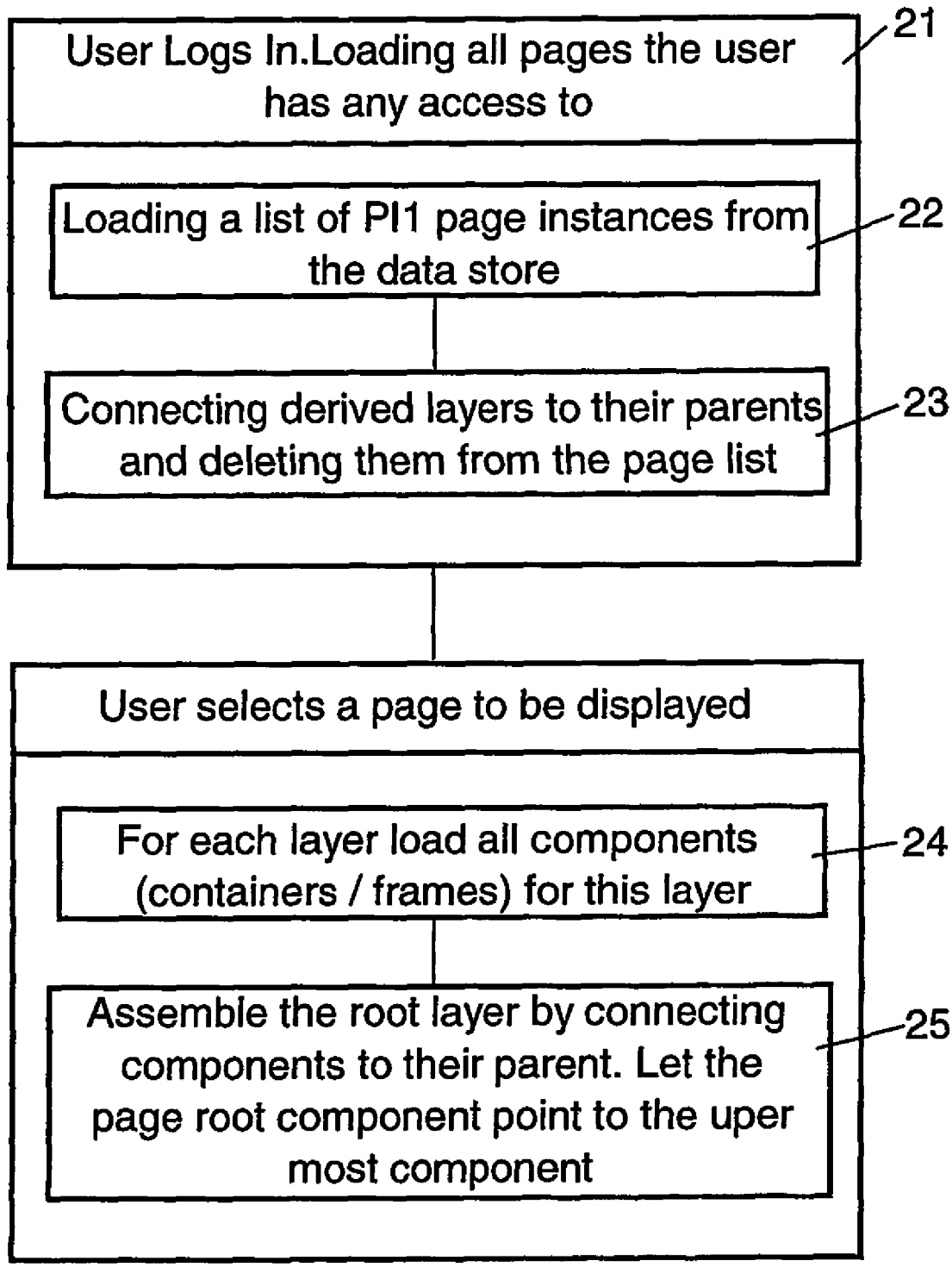
FIG. 8 shows a flow chart for construction of a page according to the present invention.
Figure 8B:
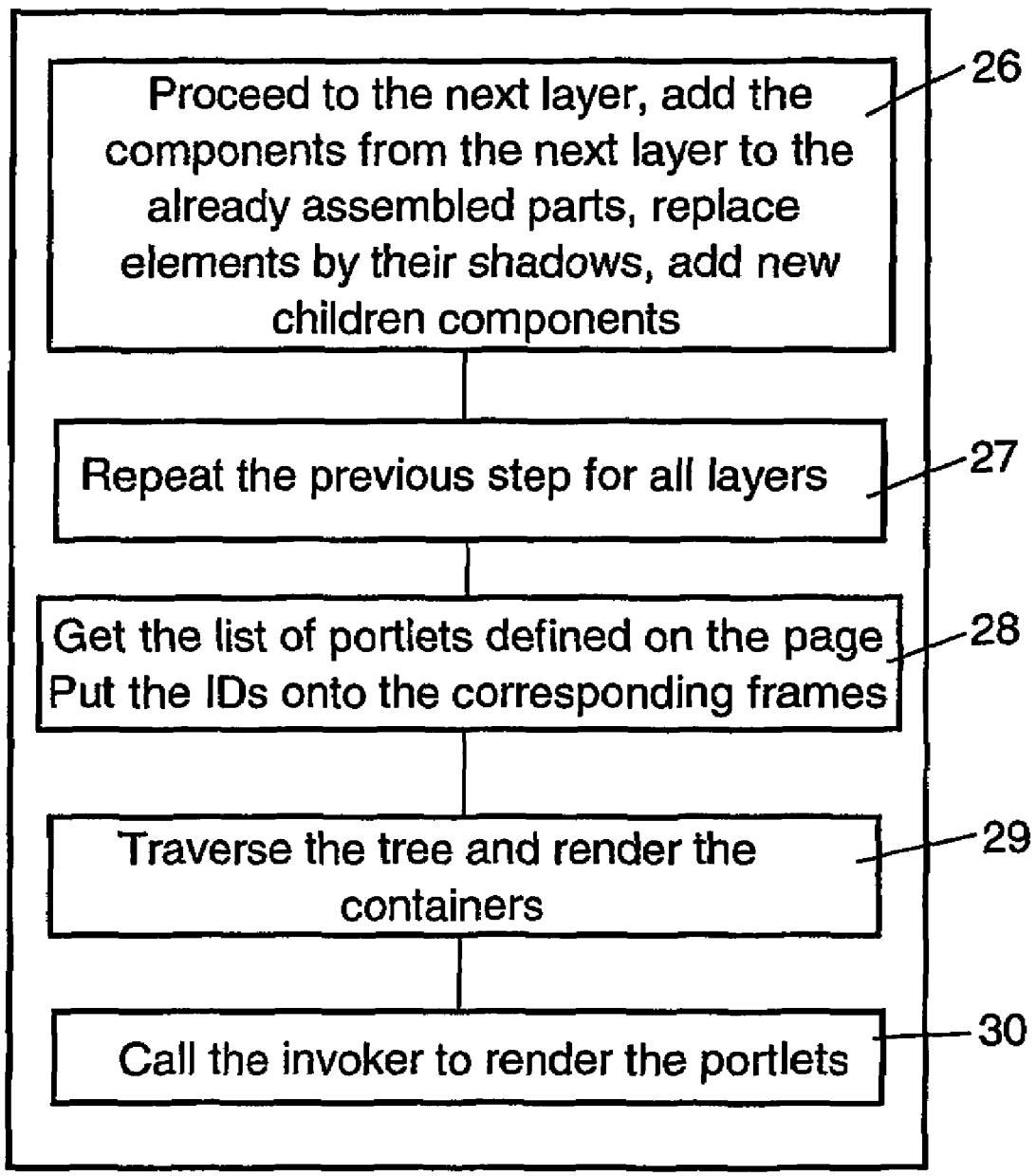

FIG. 8A/B shows the page aggregation according to the present invention. When the user of a portal makes a login 21 all pages ID are determined for which the user has access rights. Then a list of all pages instances is loaded 22 for which the user has access rights and a page list is displayed not showing derived layers instances 23. After selecting one page layer by layer all containers and frames belonging to the appropriate layer are loaded from the container data base 24. Then the container and frames are assembled layer by layer starting with upper most container of the first layer and connecting all further containers or frames to their parent 25. Then proceed to the next layer 26, add the containers or frames from the next layer to the already assembled parts, replace containers or frames by their shadows, add new children containers or frames.

Finally, the method repeats previous steps for all layers 27. Then the method gets the list of portlets defined on that page and assigns the portlet IDs to the corresponding frame 28. Then the tree is traversed and the containers are rendered and the invoker is called to render the portlet content 29,30.

The present invention may be summarized as follows: The key to the realization of the delegated page specialization as described in the previous section is to keep track of the hierarchy of page specializations. By doing so, the dependency between different specializations is maintained. At the same time, since page specialization allows the administration to be decentralized, it is possible for different people or administrators to specialize the page completely independently of each other. It is only at the time of visualization (i.e. the rendering of a Web Page or Portal Page) that the hierarchy of page specializations is constructed and aggregated to create a combined view of all page instances and its respective specializations.

As already mentioned, this patent application is not limited to any particular content type. The content type may be Web Pages ((content elements: mark-up fragments), Portal Pages (content elements: portlets), text documents (content elements: chapter, paragraphs, pictures, etc.).

By storing page specialization as content deltas and content elements (of possibly various types), and loading and re-creating it in the aforesaid fashion, it is possible to specialize content in any number of ways (only limited by the type of content elements), specialize content in any number of times (only limited by memory and storage), "view at a glance" (no links or references to follow), decentralize knowledge about the document, assign permissions to each specialization so that further specialization can be administrated in a decentralized fashion (in a centralized document it is much harder—if not impossible—to have fine-grain control over authorization).

Make modifications to a specialization that has already been further specialized.

The invention claimed is:

1. A method for specializing content of a page, comprising:
    establishing a plurality of administration levels including a defined administration level and a second administration level;
    providing a defined layer of the page created and managed by the defined administration level, wherein the defined layer provides a defined layout comprising a plurality of containers or frames, at least one immutable part of the defined layout, at least one editable part of the defined layout, and management rights of the second level of administration;
    specializing the defined layout by the second administration level to modify one or more of the at least one editable parts resulting in a first delta to the defined layout, the second administration level causing the first delta to include at least one immutable part and at least one editable part, and management rights of a third administration level;
    the third administration level specializing the defined layout or the first delta to modify one or more of the at least one editable parts of the defined layout or first delta resulting in a second delta;
    storing the first delta as a second layer of the page;
    storing the second delta as a third layer of the page; and
    assembling the page as a union of the defined layer, the second layer, and the third layer for display to a user having access rights to the page.

2. The method of claim 1, wherein the second layer comprises at least one container being assigned by an identification to at least one parent container of the defined layer.

3. The method of claim 1, wherein the layers are stored in a tree-structure.

4. The method of claim 1, wherein the page is presented in a form of a Web Page, a Portal Page, or a text document of a text processing system.

5. The method of claim 1, wherein the page is a Portal Page provided by a portal system, wherein said portal system comprises an authentication component for user authentication, an authorization component for providing user access to authorized content, portlets for rendering content, and an aggregation component for aggregation of content provided by the portlets.

6. The method of claim 5, wherein a portlet ID is assigned to each frame.

7. The method of claim 1, wherein said delta is characterized by deleting, adding, or moving one or more containers or frames with respect to the defined layer.

8. The method of claim 1, wherein the defined administration level is the first administration level and the defined layout is a basic layout.

9. The method of claim 1, wherein the page is additionally defined by a page title and a page description.

10. The method of claim 1, wherein the specializing step comprises the steps of deleting, adding, and moving containers or frames.

11. The method of claim 1, wherein each newly added layer is added to a layer table which contains layer IDs, their parent layer IDs, and their assigned page ID.

12. The method of claim 1, wherein each newly added container is added in a container table which contains container IDs, their parent container IDs, and their assigned layer IDs.

13. The method of claim 12, further comprising the steps of:
    receiving input from a user requesting a page,
    determining layers belonging to the page by using the layer table,
    determining and loading on a layer by layer basis all containers and frames belonging to the layers by using the container table,
    assembling the containers and frames by starting with the first layer and connecting all containers and frames according to their parent relationship, and
    visualizing the containers and frames by rendering the containers and frames according to their parent-relationship.

14. The method of claim 13, wherein the page is a Portal Page, the assembling step further includes the step to assign portlet IDs to each frame and the visualizing step further includes the step to render content to be provided by the portlets.

15. A text processing system including a memory for specializing content of a page display configured to execute the method according to claim 1.

16. The text processing system according to claim 15, wherein the container represents chapter and the frame represents paragraphs.

17. A computer program product stored on a computer readable media, containing program code to execute the method in accordance with claim 1.

18. The method of claim 1, wherein subsequent specialization of the defined layout by the second administration level is stored in the first delta.

* * * * *